(12) United States Patent
James

(10) Patent No.: US 6,963,743 B1
(45) Date of Patent: *Nov. 8, 2005

(54) AUDIO PANEL WITH WIRELESS TELEPHONE INPUT

(75) Inventor: Timothy W. James, Olathe, KS (US)

(73) Assignee: Garmin Ltd., (KY)

( * ) Notice: Subject to any disclaimer, the term of this patent is extended or adjusted under 35 U.S.C. 154(b) by 477 days.

This patent is subject to a terminal disclaimer.

(21) Appl. No.: 10/095,808

(22) Filed: Mar. 12, 2002

(51) Int. Cl.[7] .............................................. H04Q 7/20
(52) U.S. Cl. ..................... 455/431; 455/66.1; 455/403; 379/159; 381/86
(58) Field of Search ............................. 455/431, 403, 455/418, 420, 66, 74.1; 379/159; 381/86

(56) References Cited

U.S. PATENT DOCUMENTS

| | | | | |
|---|---|---|---|---|
| 3,999,015 A | * | 12/1976 | Snyder et al. | 379/171 |
| 5,808,661 A | * | 9/1998 | Infiesto et al. | 348/14.01 |
| 6,075,533 A | * | 6/2000 | Chang | 345/786 |

* cited by examiner

Primary Examiner—Vivian Chin
Assistant Examiner—Sanh Phu
(74) Attorney, Agent, or Firm—Devon A. Rolf

(57) ABSTRACT

An audio panel (10) with a wireless telephone input or interface (54) that provides wireless telephone calling capabilities without affecting other communications functions of the audio panel (10). The telephone interface (54) adds a telephone as a node on the intercom system of the audio panel (10) to eliminate the need for separate hook switches at each communication station in an aircraft.

17 Claims, 1 Drawing Sheet

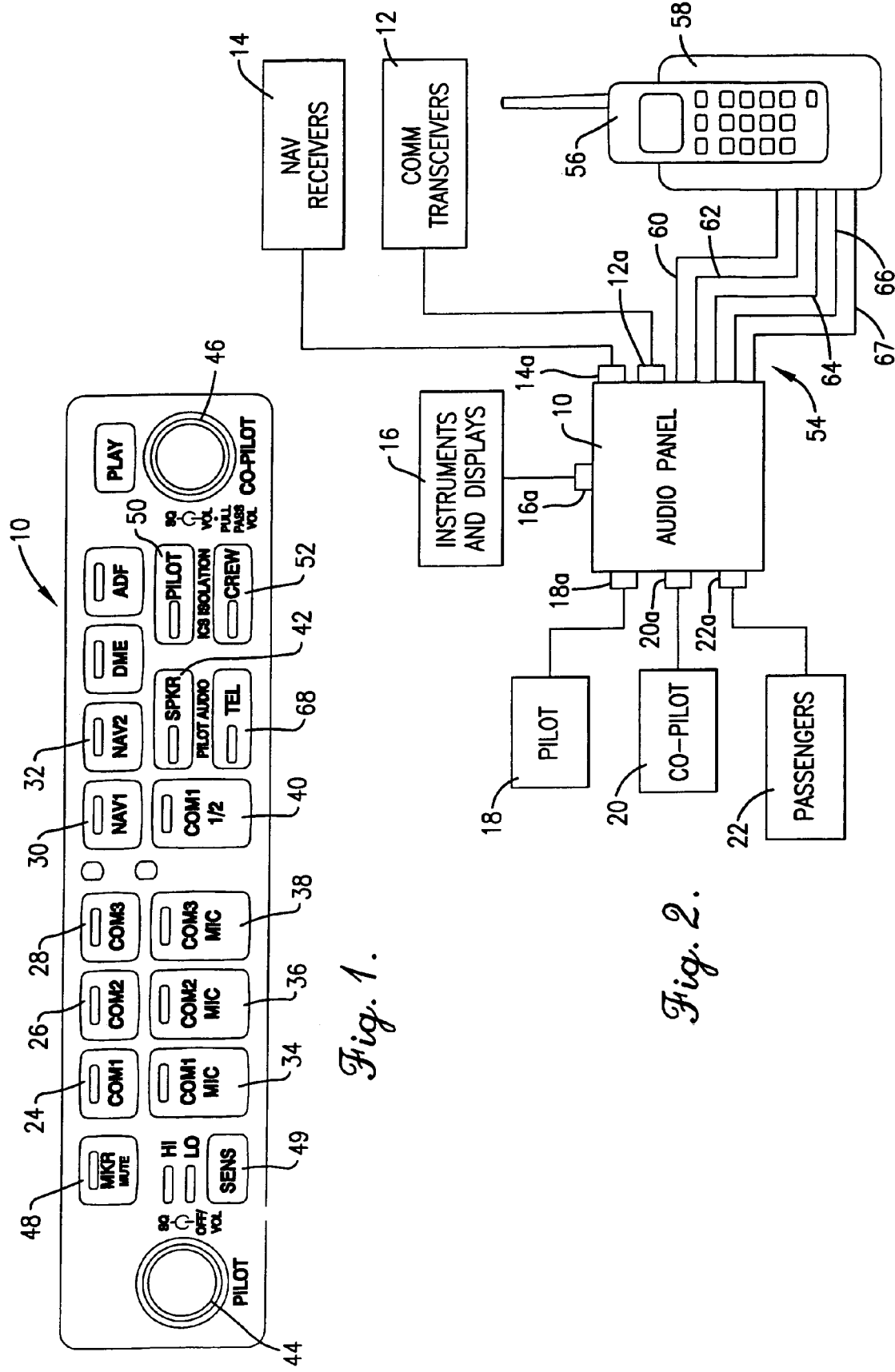

AUDIO PANEL WITH WIRELESS TELEPHONE INPUT

BACKGROUND OF THE INVENTION

1. Field of the Invention

The present invention relates to aircraft communications systems. More particularly, the invention relates to an audio panel for switching audio communications in an aircraft and having a wireless telephone input that permits selected persons in the aircraft to make and receive wireless telephone calls without affecting other communication functions.

2. Description of the Prior Art

Aircraft frequently receive and transmit communications and navigation signals over a plurality of communication and navigation channels. To simplify the selection and use of different communication and navigation channels, most aircraft include one or more audio panels that include circuitry and controls for switching between the various available communications and navigation channels. Conventional audio panels include intercom isolation circuitry having several isolation modes that permit audio communications to be selectively delivered to certain people in the aircraft such as the pilot and/or crew and isolated from others such as passengers.

With the ever increasing popularity of cellular and other wireless phones, many people desire to make and receive telephone calls while in an aircraft. However, the Federal Communications Commission (FCC) strictly prohibits unauthorized use of wireless telephone devices while an aircraft is in flight. Therefore, aircraft operators prohibit and/or strictly regulate the use of conventional wireless telephone devices in aircraft.

To permit controlled use of wireless telephone devices in an aircraft, it is known to provide a wireless telephone input to an audio panel so that telephone calls may be made and received via the audio panel. This permits the crew to control the time and manner of wireless telephone calls via the audio panel. One such prior art audio panel includes a cellular telephone interface that may be connected with a wireless telephone. The audio panel requires that each headset position or communication station in the aircraft have a separate hook switch that connects that headset or station to the telephone interface. Unfortunately, this arrangement prohibits the pilot and crew from switching between various communications channels when a telephone call is being made or received. Moreover, this arrangement allows all stations having hook switches, including passengers, to hear all phone conversations simply by placing their hook switches in the off-hook position.

Accordingly, there is a need for an improved audio panel that provides wireless telephone call capabilities without the limitations set forth above.

SUMMARY OF THE INVENTION

The present invention solves the above-described problems and provides a distinct advance in the art of aircraft audio panels. More particularly, the present invention provides an audio panel with a wireless telephone input or interface that provides wireless telephone calling capabilities without affecting other communication functions of the audio panel. The present invention also allows a pilot or crew member to control access to telephone calls so that calls may be made in private. The present invention achieves the foregoing and other operations with a minimum number of components so as to minimize the number of buttons and other controls on already crowded audio panels.

An audio panel constructed in accordance with one preferred embodiment of the present invention broadly includes intercom switching circuitry, a telephone interface coupled with the intercom switching circuitry, and a control device coupled with the telephone interface and the intercom switching circuitry. The intercom switching circuitry is provided for switching audio communications between communications equipment operated or worn by people in the aircraft and includes at least two isolation modes for switching audio communications between at least two selected groups of people in the aircraft. The telephone interface is adapted for coupling with a wireless phone and is configured for adding the wireless phone as a node on the intercom switching circuitry. The control device is preferably a single push button switch, toggle switch or rotary switch that controls distribution of telephone calls to selected stations in the aircraft via the intercom switching circuitry.

The telephone interface and control device enable the full capabilities and flexibility of the audio panel intercom system to be transferred to wireless phone calls. Specifically, the intercom isolation modes are used in conjunction with the control device to provide the telephone interface as an additional node on the intercom system without requiring individual hook switches at each communication station in the aircraft. The intercom switching circuitry may be operated to divide communication stations into separate loops and the control device may be activated to determine to which loop a phone call is connected.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is an elevational view of the front face of an audio panel constructed in accordance with a preferred embodiment of the present invention.

FIG. 2 is a schematic diagram depicting the connection of the audio panel to a wireless phone and various other instruments and controls in a typical aircraft.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIG. 1, an audio panel 10 constructed in accordance with a preferred embodiment of the invention is illustrated. The audio panel 10 is preferably designed for use in an aircraft and, as illustrated in FIG. 2, includes conventional ports, interfaces or wiring connectors (collectively referred to herein as ports) for coupling with a plurality of audio communication (Comm) transceivers 12, a plurality of navigation (Nav) receivers 14, various conventional instruments and displays 16, and communications stations or jacks that in turn may be coupled with communication equipment 18, 20, 22 such as headphones operated or worn by a pilot, crew members, and passengers, respectively.

Specifically, the audio panel includes at least a communications port 12a, a navigations receiver port 14a, an instrument/display port 16a, a pilot communication station port 18a, a co-pilot communication system port 20a and a passenger communication station port 22a.

Many of the features and functions of the audio panel 10 are similar to those provided with the GMA 340 audio panel manufactured and sold by Garmin International, Inc. of Olathe, Kans. 66062. For example, the audio panel 10 includes a plurality of LED-illuminated push button controls 24, 26, 28, 30, 32 that provide switching between the various Comm and Nav devices 12, 14. Large buttons 34, 36, 38 activate the Comm microphones and audios for up to three Comm transceivers to simplify cockpit workload. The audio panel 10 may also include an LED-illuminated push button 40 that enables a Split Comm feature to allow the pilot to transmit/receive on Comm 1 and the co-pilot to transmit/receive on Comm 2. MASQ processing reduces ambient noise from the avionics inputs. A speaker button 42 is provided to monitor the aircraft radios.

The audio panel 10 may also include dual stereo music inputs and rotary controls 44, 46 that provide independent pilot, co-pilot, and passenger volume control. Each microphone input has a dedicated VOX circuit to ensure that only the active microphone is heard when squelch is broken. Special cabin noise de-emphasis circuitry enhances cockpit communications. A Marker Beacon Receiver/Indicator 48 with high/low sensitivity selections 49 and SmartMute marker audio muting are also provided.

The audio panel 10 may be mounted either horizontally (as illustrated in FIG. 1) or vertically. Surface mount technology provides shallow depth and light weight, which simplifies installation in the tightest aircraft spaces and saves limited panel space. Operation is available in 14 or 28 volts without voltage converters or dropping resistors. A photo cell may be provided for dimming of annunciators.

The audio panel 10 also includes a six-place VOX intercom system with intercom switching circuitry that provides three selectable modes of intercom isolation (ICS isolation modes). An All isolation mode connects audio communications to communications equipment such as headphones worn or operated by all persons or stations in an aircraft. A Crew isolation mode connects audio communications to communications equipment operated or worn by the pilot and all crew members, and a Pilot isolation mode connects audio communications only to communications equipment operated or worn by the pilot. These isolation modes are enabled by a Pilot push button switch 50 and a Crew push button switch 52. To select the All isolation mode, neither the Pilot 50 nor the Crew 52 button is activated. To select the Crew isolation mode, the Crew 52 button is activated. To activate the Pilot isolation mode, the Pilot 50 button is activated.

An additional Co-pilot intercom isolation mode may also be provided to isolate the co-pilot as well as the pilot. In this embodiment, the Crew isolation button 52 is replaced with a Coplt isolation button. The Co-pilot isolation mode connects audio communications to communications equipment worn by the pilot and passengers and is enabled by activating the Coplt button (not shown).

In accordance with one important aspect of the present invention, the audio panel 10 also includes a wireless telephone interface 54 as illustrated in FIG. 2. The interface 54 may be coupled with a wireless telephone 56 such as an analog, cellular, or digital PCS phone or a cradle 58 for the phone to add telephone calling capabilities to the audio panel 10. The interface 54 includes TEL IN 60, TEL IN RETURN 62, TEL MIC 64, TEL MIC RETURN 66, and TEL RING 67 lines to provide a dedicated telephone interface and ringing capabilities over the audio panel intercom system.

The audio panel 10 also includes a control device 68 that may be operated in conjunction with the intercom switching circuitry to control distribution of phone calls over the telephone interface 54. The telephone interface 54 and control device 68 are configured for adding the wireless phone 56 as a node on the intercom switching circuitry. This eliminates the need to provide separate hook switches at each station in the aircraft and the associated limitations of such an arrangement as described in the prior art section above. The control device is preferably a single push button switch having markings indicating its function such as "TEL" but may be any other type of selector switch. By using a single push button switch to control distribution of phone calls via the intercom switching circuitry, the number of buttons and other controls on the face of the audio panel can be minimized.

Operation of the telephone interface 54 is closely linked to the intercom system (ICS) operation. Telephone calls are initially made and received in a conventional manner. For example, a call may be made by dialing the appropriate digits on the wireless phone keypad and then pushing a Send or Talk button on the phone. Similarly, calls may be received by pushing a Talk or Send button when the phone rings. The telephone interface 54, through the TEL IN 60, TEL IN RETURN 62, TEL MIC 64, TEL MIC RETURN 66, and TEL RING 67 lines causes the ringing to be announced on the audio panel intercom system and places associated phone calls on the intercom system.

The telephone interface 54 and Tel button 68 enable the full capabilities and flexibility of the audio panel intercom system to be transferred to wireless phone calls. Specifically, the audio panel intercom system isolation modes are used in conjunction with the Tel button 68 to provide the telephone interface 54 as an additional node on the intercom system to eliminate the need for separate hook switches for each station or person on the aircraft. When the intercom system is switched to the All isolation mode, all intercom positions are connected, and the Tel button 68 controls the distribution of a wireless telephone call. When the Tel button 68 is switched to its on or selected position, a telephone call is added to the intercom system and all persons wearing or operating communications equipment coupled with the intercom system may participate in the phone call. When the Tel button 68 is switched to its off or unselected position, the telephone interface 54 is disabled and telephone calls provided by the wireless phone 56 are not present on the intercom system.

In Crew, Pilot, or Co-pilot isolation modes, the intercom system is divided into two separate loops. In the Crew isolation mode, the pilot and co-pilot share an intercom loop, while the passengers are on the opposite loop. In Pilot mode, the pilot is isolated in her own intercom loop while the passengers and co-pilot make up the opposite loop. In Co-pilot mode, the co-pilot is isolated from the pilot and passengers. In these three isolation modes, the Tel button 68 controls the distribution of a telephone call to the appropriate intercom loop. When the Tel button 68 is in its on or selected position, a telephone call is added to whichever loop includes the pilot. When the switch is in its off or unselected position, the call is added to the opposite loop.

The following table summarizes the intercom isolation modes as well as the distribution of phone calls received or made over the wireless phone 56 via the audio panel intercom system.

| ICS MODE | PILOT BUTTON | CO-PILOT BUTTON | TEL BUTTON | INPUT TO PHONE |
|---|---|---|---|---|
| ALL | OFF | OFF | OFF | None. |
|  | OFF | OFF | ON | Pilot; Co-pilot; Passengers. |
| CO-PILOT | OFF | ON | OFF | Co-pilot. |
|  | OFF | ON | ON | Pilot; Passengers. |
| PILOT | ON | OFF | OFF | Co-pilot; Passengers. |
|  | ON | OFF | ON | Pilot. |
| CREW | ON | ON | OFF | Passengers. |
|  | ON | ON | ON | Pilot; Co-pilot. |

In the modes of operation where both a selected Comm audio channel and the telephone audio are heard, the telephone audio input will be muted whenever a transmission is received on the primary Comm channel, as well as when a transmission is made on the primary Comm channel. This muting does not occur for anyone who is interfacing with the telephone but does not hear the primary Comm channel.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An audio panel for switching audio communications in an aircraft, the audio panel comprising:
   an intercom system with switching circuitry for switching audio communications to communications equipment operated or worn by people in the aircraft, the intercom switching circuitry having at least two isolated modes for switching audio communications to at least two selected groups of people in the aircraft, wherein a pilot is selectively isolated from at least a portion of the audio communications;
   a telephone interface coupled with the intercom switching circuitry and adapted for coupling with a wireless phone, the telephone interface being configured for adding the wireless phone as a node on the intercom system; and
   a control device coupled with the telephone interface and the intercom switching circuitry for controlling distribution of telephone calls within the aircraft via the intercom switching circuitry.

2. The audio panel as set forth in claim 1, the control device comprising a single push button switch the controls distribution of telephone calls to at least two selected groups of people.

3. The audio panel as set forth in claim 1, the intercom switching circuitry having an All isolation mode that connects audio communications to all communications stations in the aircraft, a Crew isolation mode that connects audio communications to pilot and crew member communication stations, and a Pilot isolation mode that connects audio communications only to pilot communication stations.

4. The audio panel as set forth in claim 3, the intercom switching circuitry also having a Co-pilot isolation mode that connects audio communications only to Co-pilot communication stations.

5. The audio panel as set forth in claim 3, the control device being operable to:
   connect a telephone call only to pilot communication stations when the intercom switching circuitry is switched to the Pilot isolation mode and the control device is switched to its on position;
   connect a telephone call only to pilot and crew communication stations when the intercom switching circuitry is switched to the Crew isolation mode and the control device is switched to its on position;
   connect a telephone call only to all communication stations when the intercom switching circuitry is switched to the All isolation mode and the control device is switched to its on position; and
   connect a telephone call only to all communication stations except the pilot communication station when the intercom switching circuitry is switched to the Pilot Isolation mode and the control device is switched to its off position.

6. The audio panel as set forth in claim 1, the Intercom switching circuitry, the telephone interface, and the control device being operable to distribute a telephone call via the intercom system without affecting switching of other audio communications by the audio panel.

7. An audio panel for switching audio communications in an aircraft, the audio panel comprising:
   communication switching circuitry for connecting the audio panel to a plurality of different communications channels to receive audio communications over the communications channels;
   intercom switching circuitry for switching audio communications between communications equipment operated or worn by people in the aircraft, wherein a pilot is selectively isolated from at least a portion of the audio communications;
   a telephone interface coupled with the intercom switching circuitry and adapted for coupling with a wireless phone, the telephone interface being configured for adding the wireless phone as a node on the intercom switching circuitry; and
   a manually-activated control device coupled with the telephone interface and the intercom switching circuitry for permitting the pilot or a co-pilot to manually connect a telephone call to the intercom switching circuitry without affecting operation of the communications switching circuitry.

8. The audio panel as set forth in claim 7, the intercom switching circuitry having at least two isolated modes for switching audio communications to at least two selected groups of people in the aircraft.

9. The audio panel as set forth in claim 7, the control device comprising a single push button switch that controls distribution of telephone calls to at least two selected groups of people.

10. The audio panel as set forth in claim 8, the intercom switching circuitry having an All isolation mode that connects audio communications to all communications stations in the aircraft, a Crew isolation mode that connects audio communications to pilot and crew member communication stations, and a Pilot isolation mode that connects audio communications only to pilot communication stations.

11. The audio panel as set forth in claim 10, the control device being operable to:

connect a telephone call only to pilot communication stations when the intercom switching circuitry is switched to the Pilot isolation mode and the control device is switched to its on position;

connect a telephone call only to pilot and crew communication stations when the intercom switching circuitry is switched to the Crew isolation mode and the control device is switched to its on position;

connect a telephone call only to all communication stations when the intercom switching circuitry is switched to the All isolation mode and the control device is switched to its on position; and connect a telephone call only to all communication stations except the pilot communication station when the intercom switching circuitry is switched to the Pilot isolation mode and the control device is switched to its off position.

12. A method of providing wireless phone service to an aircraft, the method comprising the steps of:

providing an audio panel that may receive audio communications received over a plurality of audio communications channels, the audio panel having intercom switching circuitry that includes at least two isolation modes for switching audio communications to at least two selected groups of people in the aircraft, wherein a pilot is selectively isolated from at least a portion of the audio communications;

connecting a wireless phone to the audio panel so that the wireless phone is a node on the intercom switching circuitry; and controlling distribution of telephone calls to the people in the aircraft with a manually-activated control device coupled with the intercom switching circuitry.

13. The method as set forth in claim 12, the control device comprising a single push button switch that controls distribution of telephone calls to at least two selected groups of people.

14. The method as set forth in claim 12, the intercom switching circuitry having an All isolation mode that connects audio communications to all communications stations in the aircraft, a Crew isolation mode that connects audio communications to pilot and crew member communication stations, and a Pilot isolation mode that connects audio communications only to pilot communication stations.

15. The audio panel as set forth in claim 13, the control device being operable to:

connect a telephone call only to pilot communication stations when the intercom switching circuitry is switched to the Pilot isolation mode and the control device is switched to its on position;

connect a telephone call only to pilot and crew communication stations when the intercom switching circuitry is switched to the Crew isolation mode and the control device is switched to its on position;

connect a telephone call only to all communication stations when the intercom switching circuitry is switched to the All isolation mode and the control device is switched to its on position; and connect a telephone call only to all communication stations except the pilot communication station when the intercom switching circuitry is switched to the Pilot isolation mode and the control device is switched to its off position.

16. The method as set forth in claim 12, the intercom switching circuitry, the telephone interface, and the control device being operable to connect a telephone call to people in the aircraft without affecting switching of other audio communications by the audio panel.

17. An audio panel for switching audio communications in an aircraft, the audio panel comprising:

an intercom system with switching circuitry for switching audio communications to communications equipment operated or worn by people in the aircraft, the intercom switching circuitry having an All isolation mode that connects audio communications to all communications stations in the aircraft, a Crew isolation mode that connects audio communications to pilot and crew member communication stations, and a Pilot isolation mode that connects audio communications only to pilot communication stations;

a telephone interface coupled with the intercom switching circuitry and adapted for coupling with a wireless phone, the telephone interface being configured for adding the wireless phone as a node on the intercom system; and a control device coupled with the telephone interface and the intercom switching circuitry for controlling distribution of telephone calls within the aircraft via the intercom switching circuitry, the control device being operable to— connect a telephone call only to pilot communication stations when the intercom switching circuitry is switched to the Pilot isolation mode and the control device is switched to its on position, connect a telephone call only to pilot and crew communication stations when the intercom switching circuitry is switched to the Crew isolation mode and the control device is switched to its on position, connect a telephone call only to all communication stations when the intercom switching circuitry is switched to the All isolation mode and the control device is switched to its on position, and connect a telephone call only to all communication stations except the pilot communication station when the intercom switching circuitry is switched to the Pilot isolation mode and the control device is switched to its off position.

* * * * *